March 8, 1966 P. M. SWEENEY ETAL 3,239,185
APPARATUS FOR ISOLATING VIBRATIONS
Filed Feb. 3, 1964 9 Sheets-Sheet 1

INVENTORS
LAURENCE L. EBERHART
BY PATRICK M. SWEENEY

Schmieding and Fultz
ATTORNEYS

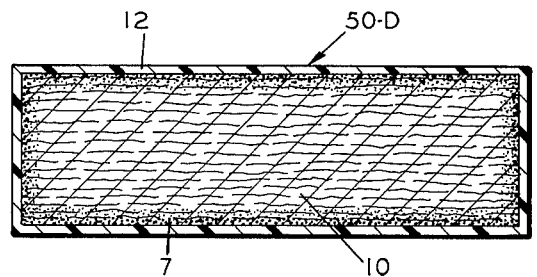
FIG. 2-A
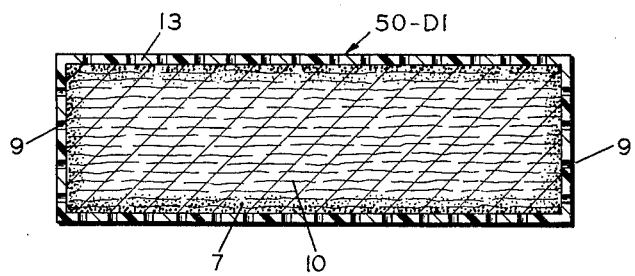
FIG. 2-B
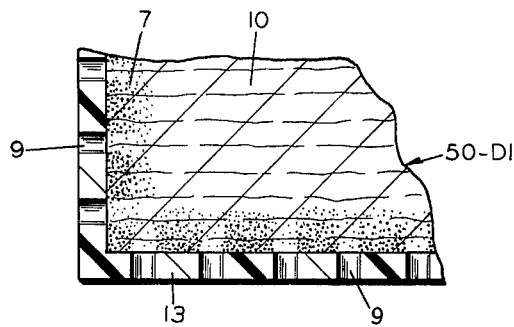
FIG. 2-C

March 8, 1966 P. M. SWEENEY ETAL 3,239,185
APPARATUS FOR ISOLATING VIBRATIONS
Filed Feb. 3, 1964 9 Sheets-Sheet 3

INVENTORS
LAURENCE L. EBERHART
PATRICK M. SWEENEY
BY
Schmieding and Fultz
ATTORNEYS

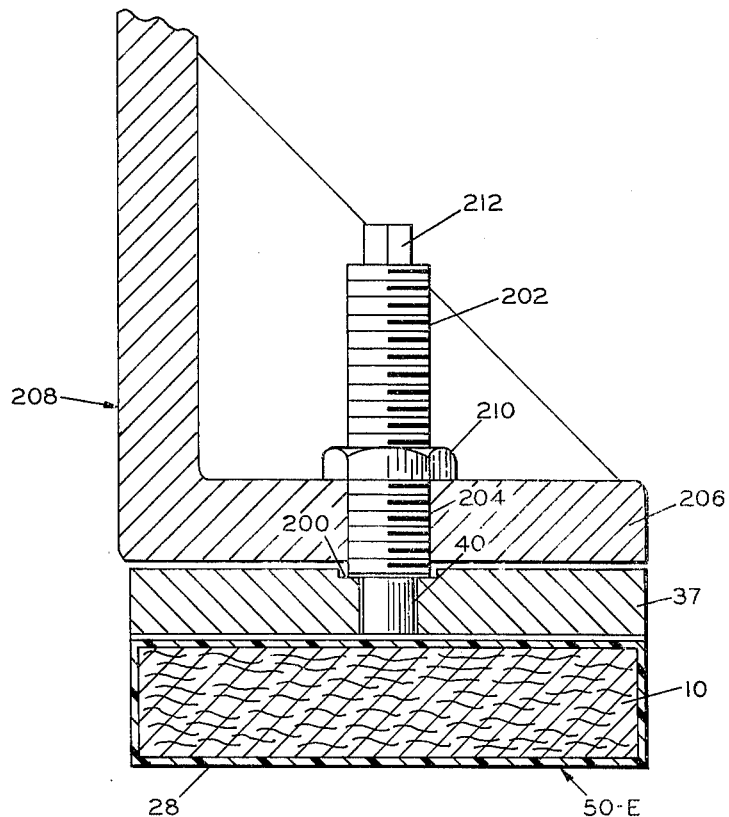
FIG. 4-A

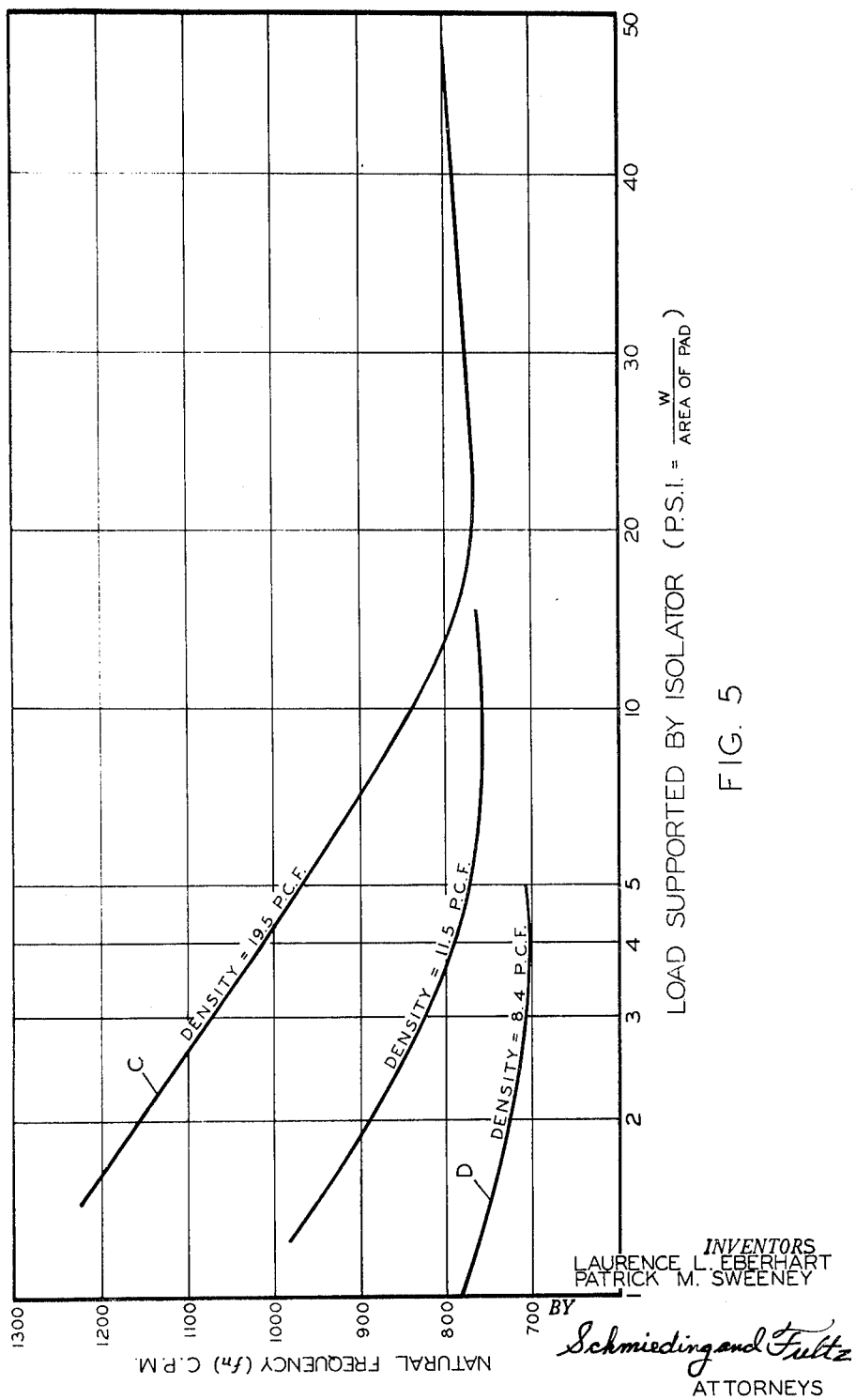

THEORETICAL VIBRATION ISOLATION CURVES

VIBRATION ISOLATION FOR 1-INCH THICK GLASS FIBER MATERIAL

VIBRATION ISOLATION FOR 2-INCH THICK GLASS FIBER MATERIAL

INVENTORS
PATRICK M. SWEENEY
LAURENCE L. EBERHART

BY *Schmieding and Fultz*
ATTORNEYS

United States Patent Office 3,239,185
Patented Mar. 8, 1966

3,239,185
APPARATUS FOR ISOLATING VIBRATIONS
Patrick M. Sweeney and Laurence L. Eberhart, Dublin, Ohio, assignors to Consolidated Kinetics Corporation, Columbus, Ohio, a corporation of Ohio
Filed Feb. 3, 1964, Ser. No. 343,909
5 Claims. (Cl. 248—358)

This application is a continuation-in-part of my copending application Serial No. 37,524 filed June 20, 1960, now abandoned which is a continuation-in-part of my copending application Serial No. 818,201, filed June 4, 1959, now abandoned.

This invention relates to supporting structures for isolating apparatus from environmental vibrations and for isolating vibration and shock inducing apparatus from adjacent areas.

In general, the present invention relates to novel supports for isolating vibrations and particularly to machine mounts and caster cups for industrial machinery, business machines, and the like.

More specifically, the present invention relates to glass fiber pads uniquely adapted for supporting the legs of machine tools or the like since the pads are provided with coatings of synthetic resinous material applied in a controlled manner so as to form bonding surfaces for securely fastening metal load plates to the fibrous material. At the same time, the repeatable load deflection characteristics of the glass fiber pads are preserved by the unique controlled coating wherein the synthetic resinous material used to form the coating is caused to impregnate the interstices of the glass fiber material only in the outer regions of the pad. This provides a rigidly attached resinous interlayer between the glass fiber material and the metal load plates that directly support the legs or base portions of machine tools or the like.

Certain pads of glass fiber material are uniquely excellent for isolating vibrations provided the density of the material is greater than eight pounds per cubic foot, the diameters of the glass fibers are less than .00050 of an inch, and the lengths of the glass fibers are disposed transversely of the direction of load application. For example, fiber diameters between .00020 of an inch and .00024 of an inch gives excellent results in most applications. It has been found that fiber diameters greater than .00060 of an inch result in natural frequencies that are too high for achieving effective vibration isolation and, moreover, pads formed thereof are characterized by inadequate load bearing characteristics. By careful selection of glass fiber diameters, of the air space between the individual fibers, the density, and loading, glass fiber performs like a damped, non-linear spring due to the elasticity of the glass and the pumping action of the entrapped air. Compressing the glass fiber to heavy densities comparable to balsa wood or soft pine, large loads per unit area can be carried by the glass fiber and the damped non-linear spring action is retained.

It has further been discovered in accordance with the present invention that improved vibration isolation supports having a constant natural frequency under variations in the weight of the load being supported can be fabricated in accordance with the equation $W = W_0 e^{A(d-d_0)}$, said equation to be described in detail later herein.

There are two aspects to the problem of vibration isolation: First, the isolation of forces of the type created by rotating and reciprocating machinery, such as fans, compressors, electric motors, and diesel engines; and Second, the isolation of motions such as occur in airplanes, ships, vehicles, industrial buildings, offices, and even residential buildings.

The principal objective in the first mentioned aspect is the reduction in the magnitude of the force transmitted to the support for the machinery.

In the second aspect, the principal objective is a reduction in the vibration amplitude so that the mounted equipment or occupants will be subjected to vibration of less severity than the supporting structure.

The general principle, in both cases, is to mount the equipment upon resilient supports or isolators in such a manner that the natural frequency of the equipment-and-isolator system is substantially lower than the frequency of the vibration to be isolated.

Various densities of glass fiber material have a load bearing range in which deflection occurs comparable to that of a non-linear spring.

In general, the supporting structures of the present invention include pads of glass fiber material to which are bonded rigid load plates for supporting vibration sensitive apparatus or vibration inducing equipment.

In accordance with the present invention, the novel vibration isolation supports most effectively utilize the previously mentioned vibration isolating property of glass fiber pads for maintaining a constant natural frequency under variations in the weights of the loads being supported. Moreover, the vibration isolation supports of the present invention possess excellent internal damping characteristics which provides stability for the mounted object.

It is another aspect of the present invention to provide a novel machine mount construction particularly adapted to support precision machine tools so as to prevent the transmission of vibrations from a machine to the floor and from the floor to the machine.

It is therefore a primary object of the present invention to provide an improved vibration isolating machine mount that includes glass fiber material provided with a unique coating that forms a securely bonded interlayer between the glass fiber material and a metal load plate that directly underlies the machine being supported.

It is another object of the present invention to provide an improved vibration isolating machine mount that includes glass fiber material provided with a unique coating that maintains the repeatable load deflection characteristics of glass fiber pads which characteristics result from a novel manner of loading the pads in accordance with a formula discussed in detail later herein.

It is another object of the present invention to provide an improved vibration isolating machine mount that includes glass fiber material provided with a unique coating that is fluid impervious and adapts the fibrous material and its cover to function as a mechanically damped air spring.

It is another object of the present invention to provide an improved vibration isolating machine mount that is fluid pervious and adapts the fibrous material and its cover to function as a mechanical spring with viscous damping.

It is another object of the present invention to provide novel vibration isolation supports that include glass fiber spring systems that maintain constant natural frequency with variations in the load being supported and which possess superior internal damping characteristics whereby the supports more efficiently isolate vibration sensitive apparatus from environmental vibrations.

It is another object of the present invention to provide novel supporting structures of the type described which can be prefabricated in standardized units and hence readily installed at low cost.

It is another object of the present invention to provide novel supporting structures of the type described that provide effective reduction of vibration even at low frequencies.

It is another object of the present invention to provide novel supporting structures the dimensions of which are relatively non-critical in regard to achieving the vibration reduction.

It is another object of the present invention to provide novel supporting structures for isolating vibrations, the vibrational properties of which are relatively independent of temperature, humidity, and exposure to oil and other contaminates.

It is another object of the present invention to provide an improved machine mount which more efficiently serves as a vibration isolator between a machine and the supporting floor.

Further objects and advantages of the present invention will be apparent from the following description, reference being had to the accompanying drawings wherein prefered forms of embodiments of the invention are clearly shown.

Figure 2:
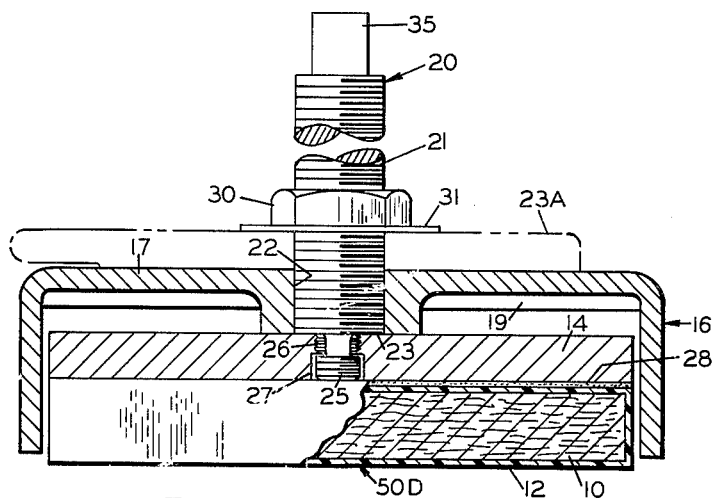
FIG. 2 is a side sectional view of the machine mount of FIG. 1, the section being taken along the line 2—2 of FIG. 1.
Figure 3:
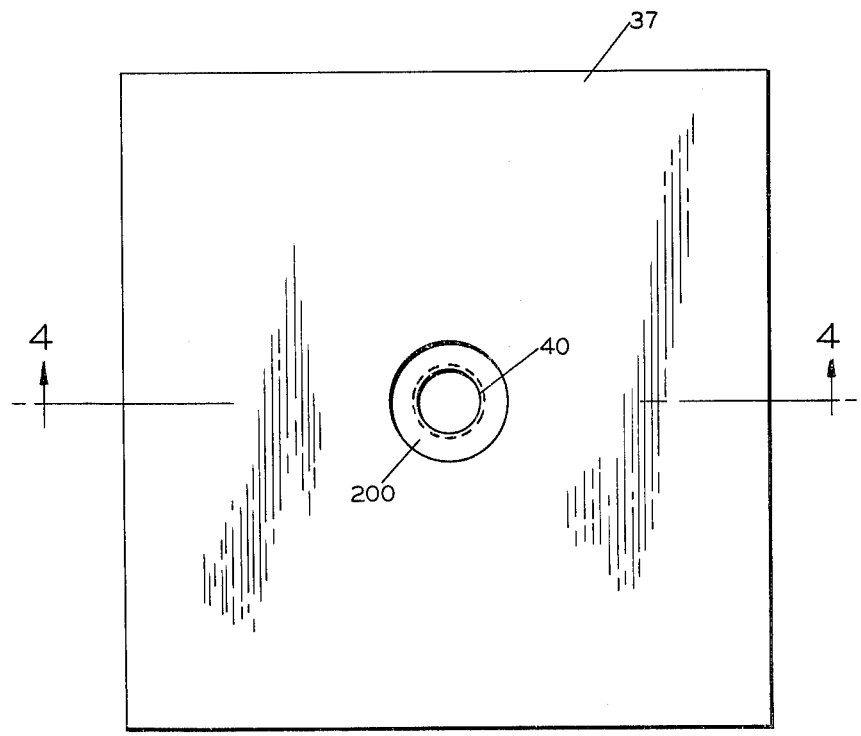
Figure 4:
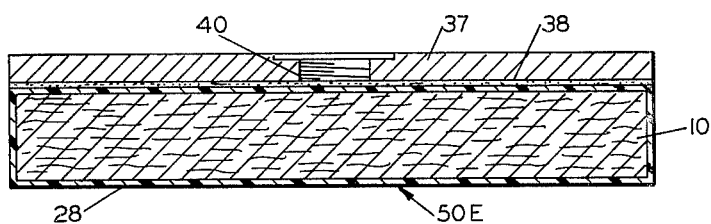
Figure 6:
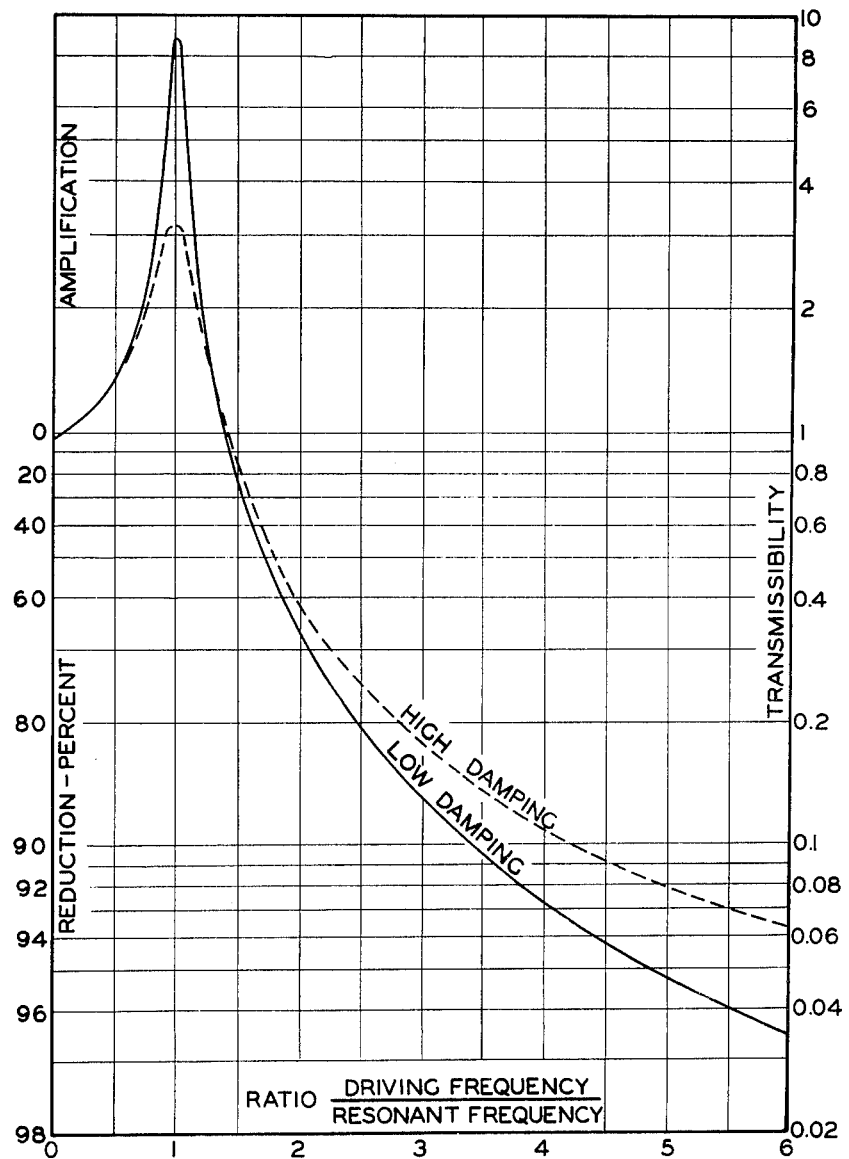
Figure 7:
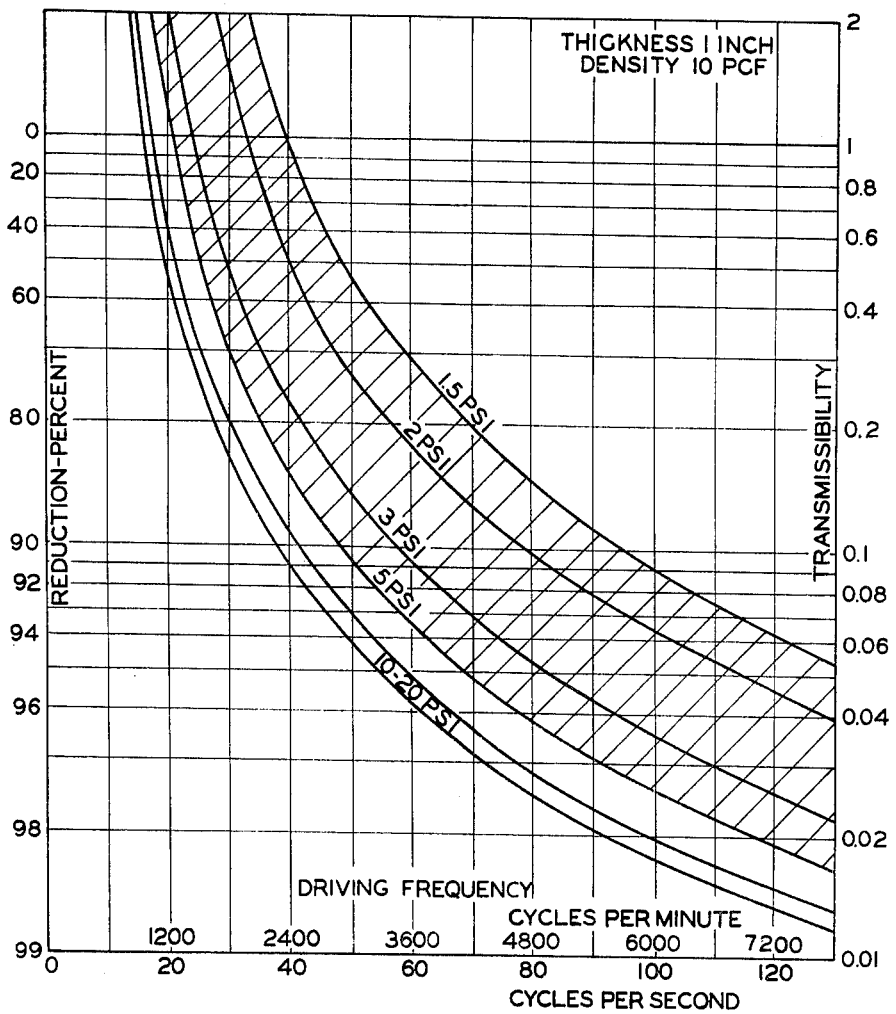
Figure 8:
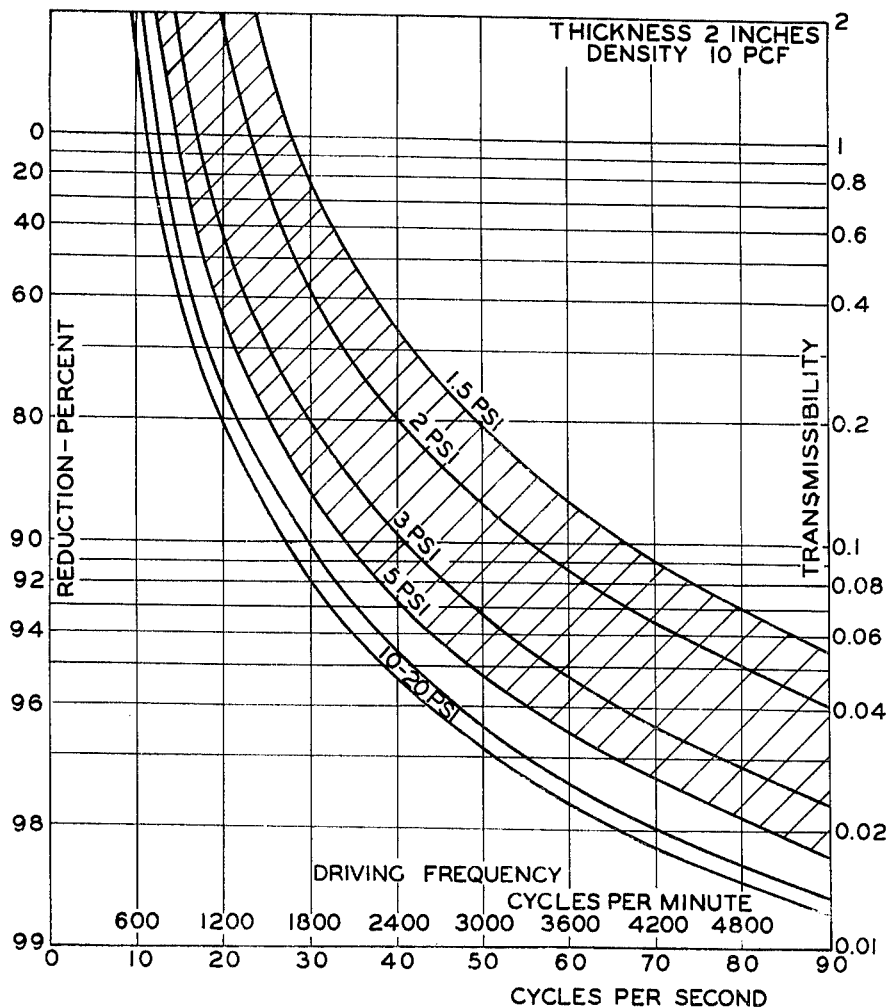
Figure 9:
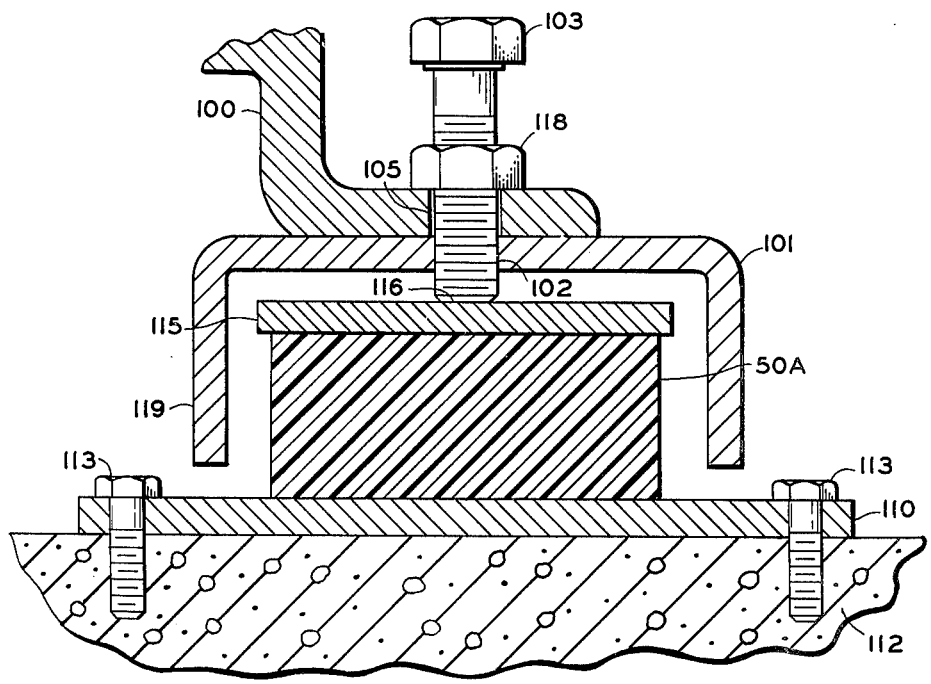

FIG. 2-A is a side sectional view of a coated glass fiber isolation pad constructed in accordance with the present invention;

FIG. 2-B is a side sectional view of a modified coated glass fiber isolation pad constructed in accordance with the present invention;

FIG. 2-C is an enlarged partial side sectional view of the modified isolation pad of FIG. 2-B;

FIG. 3 is a top elevational view of a second machine mount constructed in accordance with the present invention;

FIG. 4 is a side sectional view of the machine mount of FIG. 3, the section being taken along the line 4—4 of FIG. 3;

FIG. 4A is a partial side sectional view of the machine mount and machine base. This figure shows a second method of utilizing the machine mount construction of FIGS. 3 and 4;

FIG. 5 is a graph showing the relationship between natural frequencies and variations in loads being supported by vibration isolation supports constructed in accordance with the present invention;

FIG. 6 is a graph illustrating theoretical vibration isolation curves;

FIG. 7 is a graph showing the vibration isolation characteristics of one-inch thick glass fiber material;

FIG. 8 is a graph showing the vibration isolation characteristics of two-inch thick glass fiber material; and FIG. 9 is a side sectional view of a novel machine mount constructed according to the present invention, the section being taken along a vertical plane through the center line of the structure.

Figure 1:
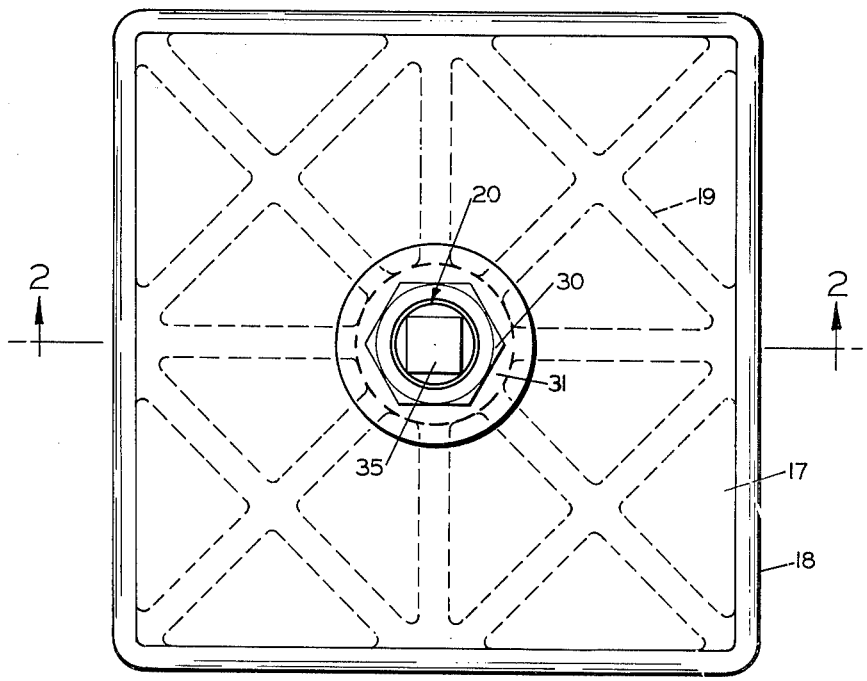
FIG. 1 is a top elevational view of a machine mount constructed in accordance with the present invention.

Referring in detail to the drawings, FIGS. 1 and 2 illustrate a machine mount constructed in accordance with the present invention that includes a composite pad 50–D comprising a pad of glass fiber material 10 provided with a flexible casing 12.

FIG. 2-A is an enlarged view of composite pad 50–D which illustrates that the material which forms the flexible covering 12 impregnates only the outer regions of the pad at an impregnated zone 7.

Flexible covering 12 can be formed of neoprene, vinyl, or other suitable resinous composition by applying the composition, in a liquid state, to the pad 10 of glass fibrous material in such a manner that the liquid composition penetrates the interstices between the glass fibers only in the outer impregnated zone 7.

It should be emphasized at this point, that impregnation of the inner regions of the pad of glass fiber material 10 results in excessive stiffness of the pad with a resulting detrimental effect on the load/deflection characteristics of the glass fiber material.

On the other hand, application of a flexible covering such as 12 without impregnation of the covering composition into impregnated zone 7 results in a structurally weak covering that is not strongly bonded to the fibers and interstices of the outer impregnated zone 7.

It will be understood that with the covering 12 rigidly secured to the pad 10 by actual impregnation into the outer zone 7 the covering 12 is uniquely structurally adapted for attachment to the load plate 14 shown in FIG. 2.

Reference is next made to FIGS. 2–B and 2–C which illustrate a modified composite pad 50–D1 which differs from pad 50–D in that it includes a modified flexible covering 13 provided with minute openings 9 that form passages for the ingress and egress of air to and from the interstices in the inner regions of glass fiber pad 10 which interstices are formed by spaces between the individual fibers at non-contacting portions of the fiber lengths.

It should be pointed out that such interstices are present even though the fibers are bonded together in contacting portions of the lengths so as to retain the fibers together at spaced intersecting junctions.

It should be pointed out that composite pad 50–D with its impervious covering 12 functions as a mechanically damped air spring whereas composite pad 50–D1 functions as a mechanical spring with viscous damping as a result of the pumping action of air through minute passages 9 between the interstices within the pad and the environment.

Pad 50–D supports a load plate 14 which in turn supports a housing indicated generally at 16 that includes a top wall 17, side walls 18, and a plurality of integrally molded stiffener ribs 19.

A threaded fastener indicated generally at 20 includes a threaded shank portion 21 in threaded engagement with a hole 22 in cover portion 16. A shoulder 23 on the lower end of threaded fastener 20 engages the top surface of load plate 14 whereby rotation of threaded fastener 20 raises and lowers cover 16 relative to load plate 14. A leg of a machine being supported is indicated at 23–A, said leg being carried by the top wall 17 of cover plate 16.

A threaded lower tip portion 25 on threaded element 20 is screwed down through threaded hole 26 and disposed freely in recess 27. The enlarged threaded tip 25 serves to pick up the load plate 14 and composite pad 50–D when the machine is lifted and moved since the top surface of pad 50–D is bonded to the lower surface of load plate 14 by a layer of suitable bonding material 15.

A lock nut 30 and washer 31 overlie leg 23–A of the machine being supported.

In operation, lock nut 30 is loosened and screw 20 is manipulated by attaching a wrench to the square upper end 35 of threaded element 20. After the cover plate has been raised or lowered by an appropriate amount required to level the machine being supported, lock nut 30 is tightened to prevent rotation of threaded element 20 and maintain the selected height adjustment.

Reference is next made to FIGS. 3 and 4 which illustrate a modified machine mount constructed in accordance with the present invention which includes a composite pad indicated generally at 50–E. The composite pad comprises a pad of glass fiber material 10 and a flexible cover 28.

A load plate 37 is secured to the upper surface of pad 50–E by means of a layer 38 of suitable bonding agent.

Load plate 37 includes a central threaded hole 40 for receiving the threaded shank of a stud, not illustrated, which stud is used to secure the leg of a machine being supported to load plate 37.

Reference is next made to FIG. 4A which shows an alternate method of using the machine mount of the type illustrated in FIGS. 3 and 4. The upper surface of load plate 37 includes a recess 200 for locating the lower end of a stud 202. The shank of stud 202 is in threaded engagement with a threaded hole 204 in flange 206 of a machine base indicated generally at 208.

With continued reference to FIG. 4A the flange 206 can be raised or lowered to level the machine by loosening lock nut 210 and manipulating stud 202 as may be required to extend or retract flange 206 relative to load plate 37. A wrench may be attached to the upper end of stud 202 at the flat sided upper end portion 212.

Reference is next made to FIG. 9 which illustrates another machine mount constructed in accordance with the present invention and comprising a third modification thereof.

As seen in FIG. 9, a portion of the base of a machine tool is indicated generally at 100 and rests on a mounting plate 101, the latter including a hole 102. A leveling screw 103 extends freely through a hole 105 in base 100 and is in threaded engagement with hole 102 in mounting plate 101.

The base 100 of the machine being supported can readily be leveled by loosening lock nut 118, manipulating the machine screws, one of which is illustrated at 103, and by retightening lock nut 118 after the leveling operation is completed.

With continued reference to FIG. 9, if so desired, the top surface of pad 50–A can be bonded to the lower surface of load plate 115 by neoprene or other suitable adhesive and, if desired, load plate 115 can be provided with a tapped hole for retaining the assembly on the machine when the machine is being moved.

With reference to the various composite pads 50–E and 50–D, the coverings 28 can be formed of neoprene, vinyl, or other suitable flexible composition without departing from the spirit of the present invention.

A bonding agent particularly suitable for the bonding layers 15 and 38, is a composition known as N–11 manufactured by Gates Engineering Company. This composition is particularly suitable for use with neoprene covering material.

The pads of glass fiber material 10 have the various physical characteristics, density, and glass fiber diameter previously discussed herein. Moreover, the glass fiber, in each instance, are disposed transversely to the direction of load application.

The flexible coverings 28 for the composite pads 50–D and 50–E can either be fluid impervious to provide a mechanically damped air spring, or they can be fluid pervious to provide viscous and mechanical dampening. Products of this type are disclosed and described in detail in Patent No. 3,095,187 issued June 25, 1963.

Vibratory tests on glass fiber materials have been made over a considerable range of loads. The results, shown in FIG. 7, are typical for a specific density and can be used as a basis for the design of vibration isolators. Knowing the frequency of the driving force (horizontal scale), the transmissibility of vibration reduction (vertical scale) can be read from the curves for various loads and thicknesses.

For machinery vibration isolations, materials with densities of 10 pounds per cubic foot, or greater, are most practical from a load-bearing standpoint. Design curves are shown for glass fiber to be used as vibration isolation pads. Knowing the frequency of the driving force (horizontal scale), the desired transmissibility (vertical scale) can be read from the curves for various loads and thicknesses.

For machinery vibration isolations, materials with densities of 10 pounds per cubic foot, or greater, are most practical from a load-bearing standpoint. Design curves are shown for glass fiber to be used as vibration isolation pads. Knowing the frequency of the driving force (horizontal scale), the desired transmissibility (vertical scale) can be found for various loads and thicknesses. One of the advantages of glass fiber material is that its vibration reduction is not as dependent on exact loading as the reduction for many other materials. This is because glass fiber material becomes stiffer as the load is increased and its effective resonant frequency changes less with load than the resonant frequency of many other materials. The charts show design characteristics for thicknesses of 1 and 2 inches. The reduction for other thicknesses can be found by using FIG. 7 for 1-inch and multiplying the actual driving frequency by the square root of the thickness.

As an example in using the charts, assume that it is desired to reduce the vibration of a machine by 90 percent (to ten percent of the vibration force with no isolation). The machine weights 100 pounds and has a driving frequency of 30 c.p.s. (a rotational speed of 1800 r.p.m.) with a simple unbalance load. On the design charts, the intersection of a horizontal line at 90 percent reduction with a vertical line at 30 c.p.s. driving frequency gives the static load. In FIG. 7, this point falls below the curves, which means that 90 percent reduction cannot be obtained for thicknesses of 1 inch or less. In FIG. 8, however, the point for 90 percent reduction at 30 c.p.s. falls just above the curves for a static pressure load of 10 to 20 p.s.i. The total area of isolating pads will be the total weight divided by the static pressure load, 50 to 100 square inches, and four pads about 4 x 4 inches would be satisfactory.

In operation, the supporting structure is designed in accordance with the graphs 7 and 8, or similar graphs for various other densities, taking into account the particular load to be supported and driving frequency to be encountered.

In accordance with the present invention it has been discovered that pads of glass fiber material of the type described herein have a unique characteristic that makes them particularly suitable for vibration isolation. This characteristics is the maintenance of constant natural frequency independent of the weight supported by the isolator. The advantage of this useful characteristic is only achieved if the pad of glass fiber material is properly loaded for any given natural frequency and for any given density of the glass fiber isolator.

FIG. 5 is a graph showing the variations of natural frequency $f_n$ with respect to variations in the load W supported by the isolator for various densities of glass fiber materials ranging between 8.4 and 19.5 pounds per cubic foot.

This unique characteristic of maintaining constant natural frequency can be defined mathematically since the glass fiber pads behave as isolators having a non-linear force-deflection curve whose stiffness $k_y$ remains proportional to the weight of the mounted body W at all points on the force-deflection curve. The right side of the below listed equation reduces to a constant, and the natural frequency becomes independent of the weight supported by the isolator.

(1) $$f_n = 3.13 \sqrt{\frac{k_y}{W}}$$

Substituting $k_y = dW/d\delta$ in Equation 1 (the force F is equal to the supported weight W) and rearranging terms:

(2) $$\frac{4\pi^2 fn^2}{g} d\delta = \frac{dw}{W}$$

An expression for the force-deflection curve is obtained from the integration of Equation 2. A family of curves results from this process, depending on the constant of integration. A particular curve is specified by selecting a point with the coordinates $W_0$, $\delta_0$ such that all points of the curve whose coordinates are numerically greater than $W_0$, $\delta_0$ will represent conditions of constant natural frequency. Integrating Equation 2:

(3) $$\frac{4\pi^2 fn^2}{g} \delta \Big|_{\delta_0}^{\delta} = \log W \Big|_{w_0}^{w}$$

Equation 3 may be written exponentially as follows:

(4) $$W = W_0 e^{A(\delta - \delta_0)}$$

An isolator whose force-deflection curve conforms to Equation 4 thus exhibits a constant natural frequency $f_n$ when supporting any load greater than $W_0$.

With reference to FIG. 5 the natural frequency of curve C (19.5 pounds per cubic foot density) remains substantially constant at 780 cycles per minute when the weight of the mounted body W is greater than $W_0$, with $W_0$ being equal to approximately 17 pounds as seen from the abscissa of the graph of FIG. 5 when the weight W of the mounted body is less than $W_0$ (17 pounds), the natural frequency shows the inverse tendency which is characteristic of linear isolators.

With continued reference to FIG. 5 the characteristics of a lower density isolator is illustrated by curve D. Curve D represents a density of the glass fiber material of 8.4 pounds per cubic foot. Here $W_0$ occurs approximately at 3¼ pounds load. Above this loading natural frequency remains substantially constant with variation in load and below this loading the natural frequency shows the inverse tendency which is characteristic of linear isolators.

In the formulas previously discussed herein the following symbols are defined as follows:
$W$ = actual load applied to isolator
$W_0$ = load above which natural frequency is independent of variations in load W
$\delta$ = deflection of isolator under load W
$\delta_0$ = deflection of isolator under load $W_0$
$fn$ = natural frequency
$K_Y$ = stiffness of isolator
$e$ = the basis for the Napierian system of logarithms
$g$ = gravitational constant
$\pi$ = 3.1416

$$A = \frac{4\pi^2 fn^2}{g}$$

While the forms of embodiments of the present invention as herein disclosed constitute preferred forms, it is to be understood that other forms might be adopted, all coming within the scope of the claims which follow:

We claim:
1. A vibration isolation mount system having substantially constant natural frequency under variations in the weight of the supported load, said system comprising, in combination, a pad of glass fiber material and having a density greater than eight pounds per cubic foot, said fibers extending transversely of the direction of load application, the diameters of said fibers being less than .0005 of an inch, said pad having a force-deflection curve conforming substantially with the equation

$$W = W_0 e^{A(\delta - \delta_0)}$$

a covering of flexible material enclosing said pad, said flexible material being confined to and in bonded reinforcing relationship with the fibers in the outer regions of said pad; a rigid load plate means bonded to an outer surface of said covering; and a load supported by said pad, the portion of the load supported by said pad and said load plate means having a weight substantially equal to or greater than $W_0$, the symbols in said equation being defined as follows:

$W$ = actual load applied to the pad
$W_0$ = load above which the natural frequency of the system is independent of variations in the actual load W
$\delta$ = deflection of isolator under load W
$\delta_0$ = deflection of isolator under load $W_0$
$e$ = the basis for the Napierian system of logarithms $$A = \frac{4\pi^2 fn^2}{g}$$

$fn$ = natural frequency
$g$ = gravitational constant

2. A vibration isolation mount system having substantially constant natural frequency under variations in the weight of the supported load, said system comprising, in combination, a pad of glass fiber material and having a density greater than eight pounds per cubic foot, said fibers extending transversely of the direction of load application, the diameters of said fibers being less than .0005 of an inch, said pad having a force-deflection curve conforming substantially with the equation $$W = W_0 e^{A(\delta - \delta_0)}$$

a fluid permeable covering of flexible material being confined to and in bonded relationship with the fibers in the outer regions of said pad; a rigid load plate means bonded to an outer surface of said covering; and a load supported by said pad, the portion of the load supported by said pad and said load plate means having a weight substantially equal to or greater than $W_0$, the symbols in said equation being defined as follows:

$W$ = actual load applied to the pad
$W_0$ = load above which the natural frequency of the system is independent of variations in the actual load W
$\delta$ = deflection of isolator under load W
$\delta_0$ = deflection of isolator under load $W_0$
$e$ = the basis for the Napierian system of logarithms $$A = \frac{4\pi^2 fn^2}{g}$$

$fn$ = natural frequency
$g$ = gravitational constant

3. A machine mount or the like for isolating vibrations comprising, in combination, a pad of glass fiber material including a load supporting side, the fibers of said material being cross-wise oriented substantially parallel with said load supporting side; a flexible material covering said pad of glass fiber material, the interior regions of said pad including impregnate free interstices; a rigid load plate bonded to said flexible material at said load supporting side; and a second rigid load plate overlying said first load plate; and a threaded element for adjusting the elevation of said second load plate relative to said first load plate.

4. A machine mount or the like for isolating vibrations comprising, in combination, a pad of glass fiber material including a load supporting side, the fibers of said material being cross-wise oriented substantially parallel with said load supporting side; an air impervious flexible material covering said pad of glass fiber material, the interior regions of said pad including impregnant free interstices; a rigid load plate bonded to said flexible material at said load supporting side; and a second rigid load plate overlying said first load plate; and a threaded element for adjusting the elevation of said second load plate relative to said first load plate.

5. A machine mount or the like for isolating vibrations comprising, in combination, a pad of glass fiber material including a load supporting side, the fibers of said material being cross-wise oriented substantially parallel with said load supporting side; an air previous flexible material covering said pad of glass fiber material, the interior regions of said pad including impregnant free interstices; a rigid load plate bonded to said flexible material at said load supporting side; an air pervious flexible material lying said first load plate; and a threaded element for adjusting the elevation of said second load plate relative to said first load plate.

References Cited by the Examiner

UNITED STATES PATENTS

| | | | |
|---|---|---|---|
| 1,746,902 | 2/1930 | Persons | 248—24 |
| 1,945,765 | 2/1934 | Alpern | 248—24 |
| 2,766,163 | 10/1956 | Schwartz | 248—24 X |
| 2,769,741 | 11/1956 | Schwartz | 267—1 X |
| 2,921,760 | 1/1960 | Wheeler | 248—24 |
| 3,018,991 | 1/1962 | Slayter | 248—22 |

CLAUDE A. LE ROY, *Primary Examiner.*